United States Patent
Liu et al.

(10) Patent No.: US 12,495,716 B2
(45) Date of Patent: Dec. 9, 2025

(54) BLUE LUMINESCENT COMPOUND, BLUE LUMINESCENT COMPOSITION, AND ORGANIC ELECTROLUMINESCENT DEVICE, DISPLAY DEVICE AND LIGHTING DEVICE COMPRISING SAME

(71) Applicant: Shijiazhuang Chengzhi Yonghua Display Material Co., Ltd., Hebei (CN)

(72) Inventors: Songyuan Liu, Hebei (CN); Tianyu Wei, Hebei (CN); Zhe Shao, Hebei (CN); Pengjun Bu, Hebei (CN); Shiwen Yue, Hebei (CN)

(73) Assignee: SHIJIAZHUANG CHENGZHI YONGHUA DISPLAY MATERIAL CO., LTD., Hebei (CN)

( * ) Notice: Subject to any disclaimer, the term of this patent is extended or adjusted under 35 U.S.C. 154(b) by 0 days.

(21) Appl. No.: 19/053,437

(22) Filed: Feb. 14, 2025

(65) Prior Publication Data

US 2025/0221301 A1    Jul. 3, 2025

(30) Foreign Application Priority Data

Oct. 30, 2024 (CN) .......................... 202411529893.9

(51) Int. Cl.
*C07B 59/00* (2006.01)
*C07D 307/91* (2006.01)
(Continued)

(52) U.S. Cl.
CPC ......... *H10K 85/626* (2023.02); *C07D 307/91* (2013.01); *C09K 11/02* (2013.01);
(Continued)

(58) Field of Classification Search
CPC ............... H10K 85/615; H10K 85/626; H10K 85/6574; C07D 307/91; C09K 2211/1011;
(Continued)

(56) References Cited

U.S. PATENT DOCUMENTS

2011/0121269 A1* 5/2011 Lecloux ................. C07C 15/28
564/426

FOREIGN PATENT DOCUMENTS

CN    117402130 A    1/2024
EP    3915979 A1    12/2021
(Continued)

OTHER PUBLICATIONS

WO-2024210445-A1—translation (Year: 2024).*
(Continued)

*Primary Examiner* — Jennifer A Boyd
*Assistant Examiner* — Rachel Simbana
(74) *Attorney, Agent, or Firm* — Paratus Law Group, PLLC

(57) ABSTRACT

The present invention discloses a blue luminescent compound, a blue luminescent composition, and an organic electroluminescent device, display device and lighting device comprising the blue luminescent compound or blue luminescent composition. The blue luminescent compound is selected from one of the following structures. The blue luminescent compound provided by the present invention is used as a host material in a blue luminescent layer. A triplet-triplet fusion process (TTF effect) of the material is improved by using an α-naphthalene substituent. The theoretical exciton utilization rate of the material is increased to 62.5%. The electron transmission rate of the material is improved by introducing an oxygen atom with a large electronegativity, thereby improving the carrier balance. Furthermore, by deuteration of at least part of naphthyl and an anthracene nucleus and combination with semi-deuterated dibenzofuran, the thermal stability of the material is significantly enhanced and at the same time an exciton energy rise caused by vibration in the material is reduced, thereby weakening the problems of damage and deterioration of a material in an adjacent layer by excitons, so that the lifetime of the organic electroluminescent device can be significantly improved, and defects in the prior art are overcome.

(Continued)

-continued
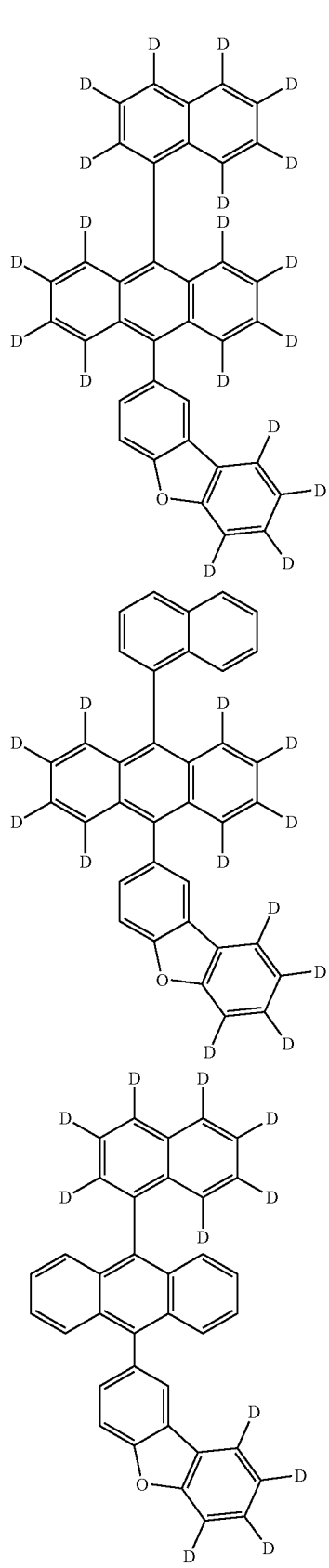
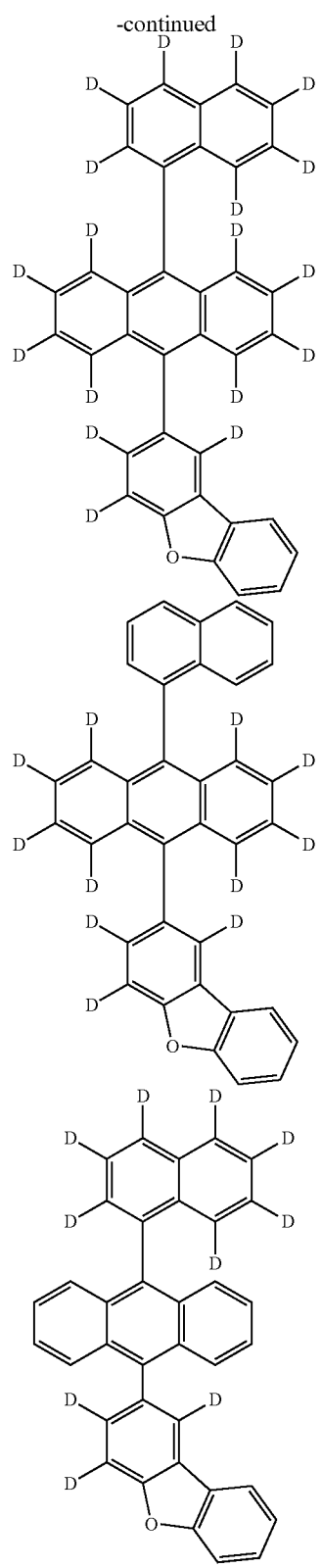
14 Claims, 1 Drawing Sheet

(51) Int. Cl.
  *C09K 11/02* (2006.01)
  *C09K 11/06* (2006.01)
  *H05B 33/14* (2006.01)
  *H10K 50/11* (2023.01)
  *H10K 50/12* (2023.01)
  *H10K 59/12* (2023.01)
  *H10K 85/60* (2023.01)

(52) U.S. Cl.
  CPC .......... *C09K 11/06* (2013.01); *H10K 85/6574* (2023.02); *C09K 2211/1011* (2013.01); *C09K 2211/1018* (2013.01); *H10K 50/11* (2023.02)

(58) Field of Classification Search
  CPC .... C09K 2211/1018; C09K 2211/1088; C07B 59/002
  See application file for complete search history.

(56) References Cited

FOREIGN PATENT DOCUMENTS

| | | | | |
|---|---|---|---|---|
| EP | | 3915979 B1 * | 6/2025 | ............. H10K 50/12 |
| KR | 10-2024-0150140 A | | 10/2024 | |
| WO | WO 2024/205192 A1 | | 10/2024 | |
| WO | WO-2024210445 A1 * | | 10/2024 | ........... C07D 307/91 |

OTHER PUBLICATIONS

Dec. 6, 2024, Chinese Office Action issued for related CN Application No. 202411529893.9.
Jan. 8, 2025, Chinese Notification of Granting Patent Right issued for related CN Application No. 202411529893.9.

* cited by examiner

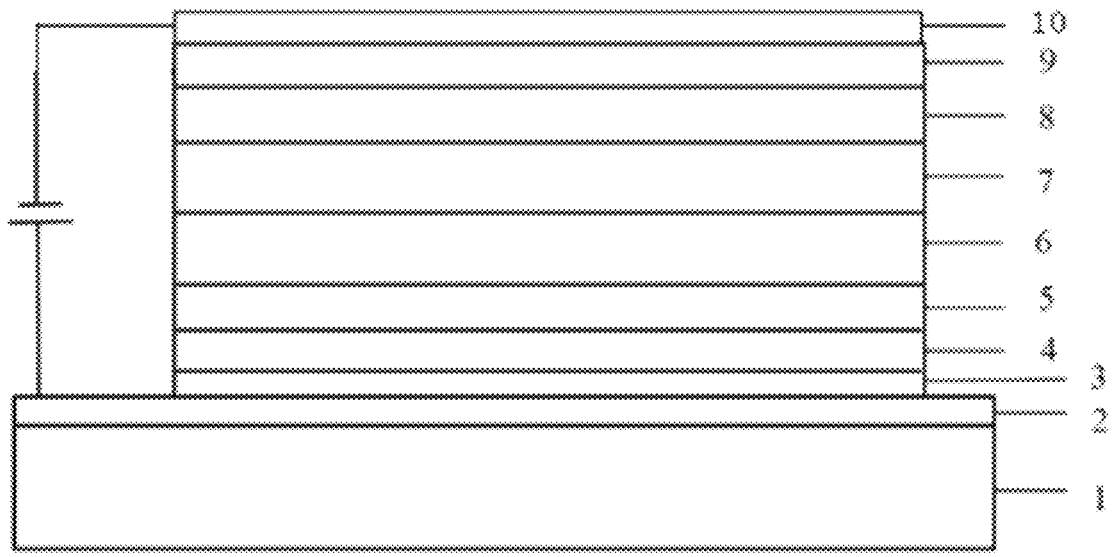

BLUE LUMINESCENT COMPOUND, BLUE LUMINESCENT COMPOSITION, AND ORGANIC ELECTROLUMINESCENT DEVICE, DISPLAY DEVICE AND LIGHTING DEVICE COMPRISING SAME

CROSS REFERENCE TO PRIOR APPLICATION

This application claims priority to Chinese Patent Application No. 202411529893.9 (filed on Oct. 30, 2024), which is hereby incorporated by reference in its entirety.

TECHNICAL FIELD

The present invention belongs to the technical field of OLEDs and in particular includes a blue luminescent compound, a blue luminescent composition, and an organic electroluminescent device, display device and lighting device comprising the blue luminescent compound or blue luminescent composition.

BACKGROUND ART

In the field of organic electroluminescent materials, the research and development of red and green luminescent materials are relatively sufficient. Since the energy gaps of red and green luminescent materials are only about 2 eV to 2.4 eV, which is far lower than the energy of chemical bonds in common organic materials, so there are a rich variety of materials to choose. At present, organometallic complexes are basically used as luminescent doping materials for red light and green light, and the theoretical exciton utilization rate during the luminescence process is increased to 100% through the spin-orbit coupling action of heavy atoms. However, for blue-light materials, since the energy gap required by blue-light luminescent materials is about 3.0 eV and blue phosphorescent materials have serious efficiency roll-off and lifetime problems leading to mass production impossibility, fluorescent materials are used in most cases. However, the theoretical exciton utilization rate of a fluorescent material for electroluminescence is only 25%, which limits the further improvement of the efficiency.

It has been found that during the process of organic electroluminescence, holes and electrons recombine into excitons in the luminescent layer, and these excitons emit photons and are then de-excited to the ground state. Generally, the hole transmission rate of an organic material is higher than the electron transmission rate, resulting in the carrier transmission in an organic electroluminescent device being unbalanced, leading to the widening of the luminescence region and the decrease of the exciton concentration. When the luminescence region spreads to the carrier transmission region, the excitons meet polarons, which causes quenching to easily occur, leading to the deterioration of the carrier transport material, seriously impairing the efficiency and lifetime of the organic electroluminescent device.

At present, common anthracene-based host materials have the problem that the anthracene nucleus skeleton is prone to dehydrogenation with a substituent to form a ring, which makes the luminescent properties of the material change significantly, thereby seriously restricting the lifetime of the organic electroluminescent material. Replacing hydrogens in the anthracene-based host material with an isotope can improve the stability of chemical bonds; however, the preparation cost will greatly increase; in addition, difference substitution sites also have difference effects on the improvement of the lifetime. Studies have stated that a thermal stability comparable to that of a perdeuterated material can be achieved only by deuterating the anthracene nucleus skeleton. However, since the host material in the luminescent layer is directly connected to an electron barrier layer, a hole transport layer, etc., the vibration of the non-deuterated carbon-hydrogen bonds may further push up the energy of the recombined high-energy excitons and increase the damage of the excitons to the adjacent layers. Hence, the lifetime performance varies as such a material is applied to different organic luminescent devices, and the research in terms of substituent deuteration remains insufficient. In addition, for the doping system during evaporation preparation, it is difficult to measure, manage and control the doping ratio between the host and guest materials and the degree of uniformity in the host material, and the uneven evaporation between organic film layers and in the films may increase the deterioration sites in the material, which is not conducive to the lifetime performance of the device.

SUMMARY OF THE INVENTION

In view of the above problems existing in the prior art, the present invention provides a blue luminescent compound, a blue luminescent composition, and an organic electroluminescent device, display device and lighting device comprising the blue luminescent compound or blue luminescent composition.

In order to achieve the above objective, the technical solution used by the present invention comprises the following content.

In a first aspect, the present invention provides a blue luminescent compound, characterized in that the blue luminescent compound is selected from one of the following structures:

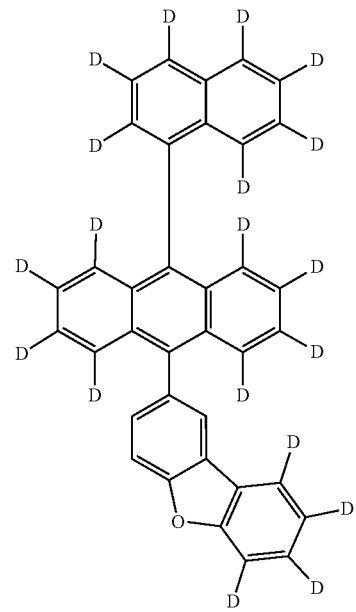

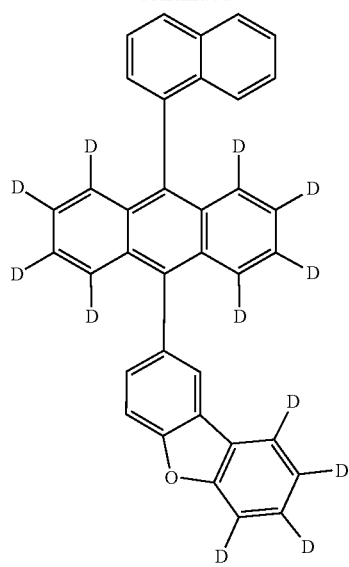
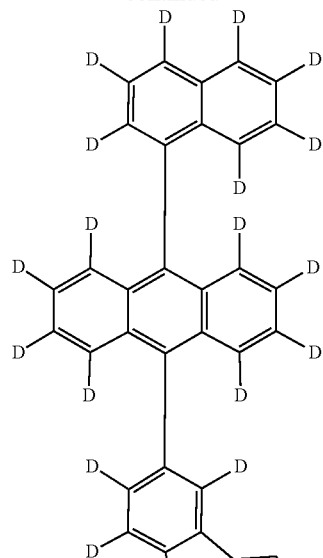
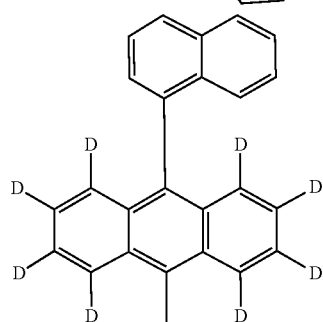

wherein in the above structures, any oxygen can be replaced by $^{17}O$ or $^{18}O$, and any carbon can be replaced by $^{13}C$.

In the above compounds, D indicates that hydrogen is replaced by deuterium, and deuterium exists at least 100 times of the natural abundance.

In a second aspect, the present invention provides a blue luminescent composition comprising two or more blue luminescent compounds as described above.

In a third aspect, the present invention provides the use of the blue luminescent compound as described above or the composition as described above in a blue luminescent layer of an organic electroluminescent device as a host material.

In a fourth aspect, the present invention provides an organic electroluminescent device comprising an anode, a hole transport region, a luminescent layer, an electron transport region, and a cathode, which are sequentially arranged on a substrate plate, wherein the luminescent layer comprises one or more blue luminescent compounds as described above or blue luminescent compositions as described above.

Furthermore, the luminescent layer comprises a host material and a guest material, wherein the host material comprises one or more blue luminescent compounds as described above or compositions as described above.

In a fourth aspect, the present invention provides a display device comprising the organic electroluminescent device as described above.

In a fifth aspect, the present invention provides a lighting device comprising the organic electroluminescent device as described above.

Beneficial Effects of the Invention

The present invention provides a blue luminescent compound for use in a luminescent layer of a blue organic electroluminescent device as a host material. By using an α-naphthalene substituent, the blue luminescent compound provided by the present invention can improve the triplet-triplet fusion process (TTF effect) of the material. The theoretical exciton utilization rate of the material is increased to 62.5%. The electron transmission rate of the material can be improved by introducing an oxygen atom with a large electronegativity, so that the transmission of carriers in the organic electroluminescent device can be balanced. Furthermore, by deuteration of at least part of naphthyl and an anthracene nucleus and combination with semi-deuterated dibenzofuran, the blue luminescent compound provided by the present invention can significantly enhance the thermal stability of the material and at the same time can also significantly reduce an exciton energy rise caused by vibration in the material, thereby weakening the problems of damage and deterioration of a material in an adjacent layer by excitons, so that the lifetime of the organic electroluminescent device can be significantly improved, and the defects in the prior art are overcome.

The present invention further provides a blue luminescent composition in a luminescent layer of a blue organic electroluminescent device as a host material. The blue luminescent composition provided by the present invention comprises two blue luminescent compounds with different deuteration sites. The use of the two host materials with different deuteration sites as a host in the luminescent layer makes it useful as a stable co-evaporation source in a vacuum deposition process, so that the film formation of the organic layer of the device can be improved and the lifetime of the device can be further improved.

BRIEF DESCRIPTION OF THE DRAWINGS

The FIGURE is a schematic structural diagram of an organic electroluminescent device of the present invention.

In the Brief Description of the Drawings: 1—substrate, 2—anode, 3—hole injection layer, 4—hole transport layer, 5—luminescent auxiliary layer, 6—luminescent layer, 7—hole barrier layer, 8—electron transport layer, 9—electron injection layer, and 10—cathode.

DETAILED DESCRIPTION OF EMBODIMENTS

In order to understand the content of the present invention more clearly, the present invention will be described in detail in conjunction with the accompanying drawings and examples.

The compound of the present invention is suitable for light-emitting elements, display panels, and electronic devices, especially for organic electroluminescent devices. The electronic device described in the present invention is a device that comprises a layer of at least one organic compound, and the device may also comprise an inorganic material or a layer formed entirely of an inorganic material. The electronic device is preferably an organic electroluminescent device (OLED), an organic integrated circuit (O-IC), an organic field-effect transistor (O-FET), an organic thin film transistor (O-TFT), an organic light-emitting transistor (O-LET), an organic solar cell (O-SC), an organic dye-sensitized solar cell (O-DSSC), an organic optical detector, an organic photosensor, an organic field-quenching device (O-FQD), a luminescent electrochemical cell (LEC), an organic laser diode (O-laser), and an organic plasma emitting device. The electronic device is preferably an organic electroluminescent device (OLED). The schematic structural diagram of an exemplary organic electroluminescent device is as shown in the FIGURE.

Experimental Part

In order to understand the content of the present invention more clearly, the polycyclic compound, the preparation method for the compound, and the luminescent characteristics of the device will be explained in detail in conjunction with examples. Various chemical reactions can be applied to the synthesis method for a compound according to one embodiment of the present invention. However, it should be noted that the synthesis method for the compound according to one embodiment of the present invention is not limited to the synthesis method described below. Unless otherwise specified, the subsequent synthesis is carried out in an anhydrous solvent in a protective gas atmosphere. Solvents and reagents can be purchased from conventional reagent suppliers.

Synthesis Example 1

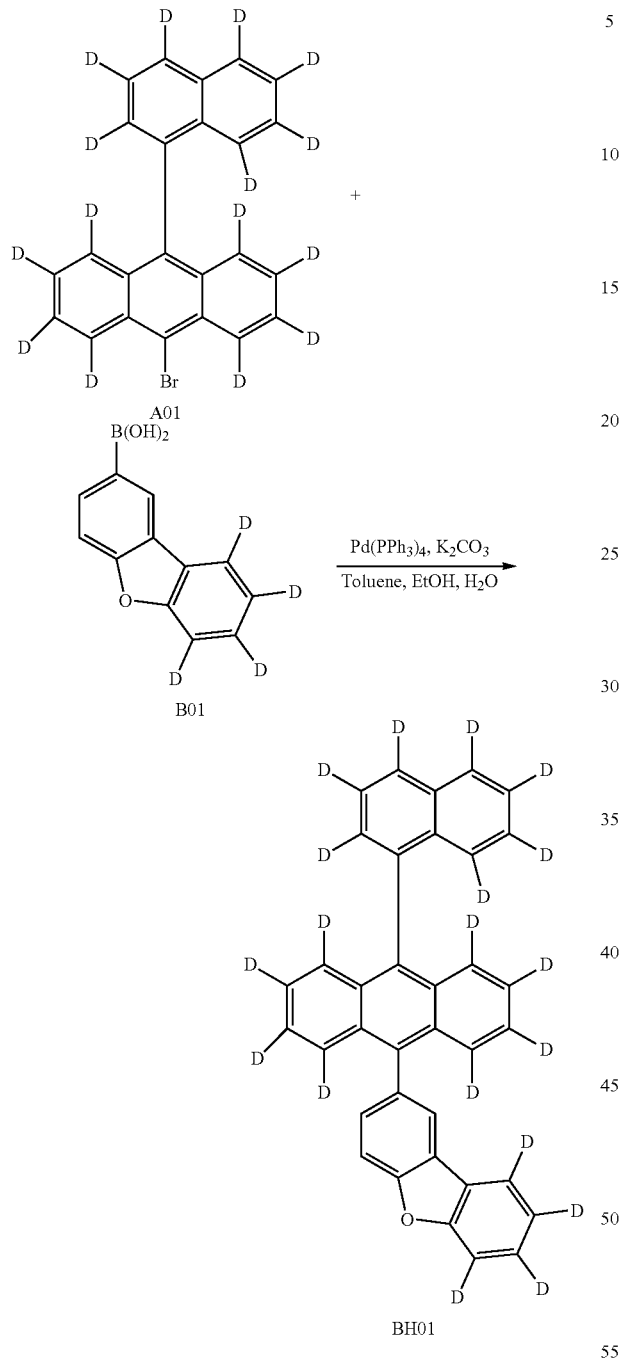

To a 250 mL three-necked flask, 50 mL of toluene, 25 mL of ethanol, and 25 mL of water were added under nitrogen protection, followed by A01 (3.98 g, 10 mmol), B01 (2.16 g, 10 mmol), potassium carbonate (4.15 g, 30 mmol), and tetrakis(triphenylphosphine) palladium (0.35 g, 0.3 mmol). The mixture was heated to 80° C. and reacted for 12 h. After the reaction was complete, the reaction product was cooled to room temperature and filtered, and the filter cake was hot dissolved with toluene, then filtered to remove solid insoluble substances, and then recrystallized to obtain Compound BH01: 4.08 g (yield: 83%), MS: m/z (M+): 491.

Synthesis Example 2

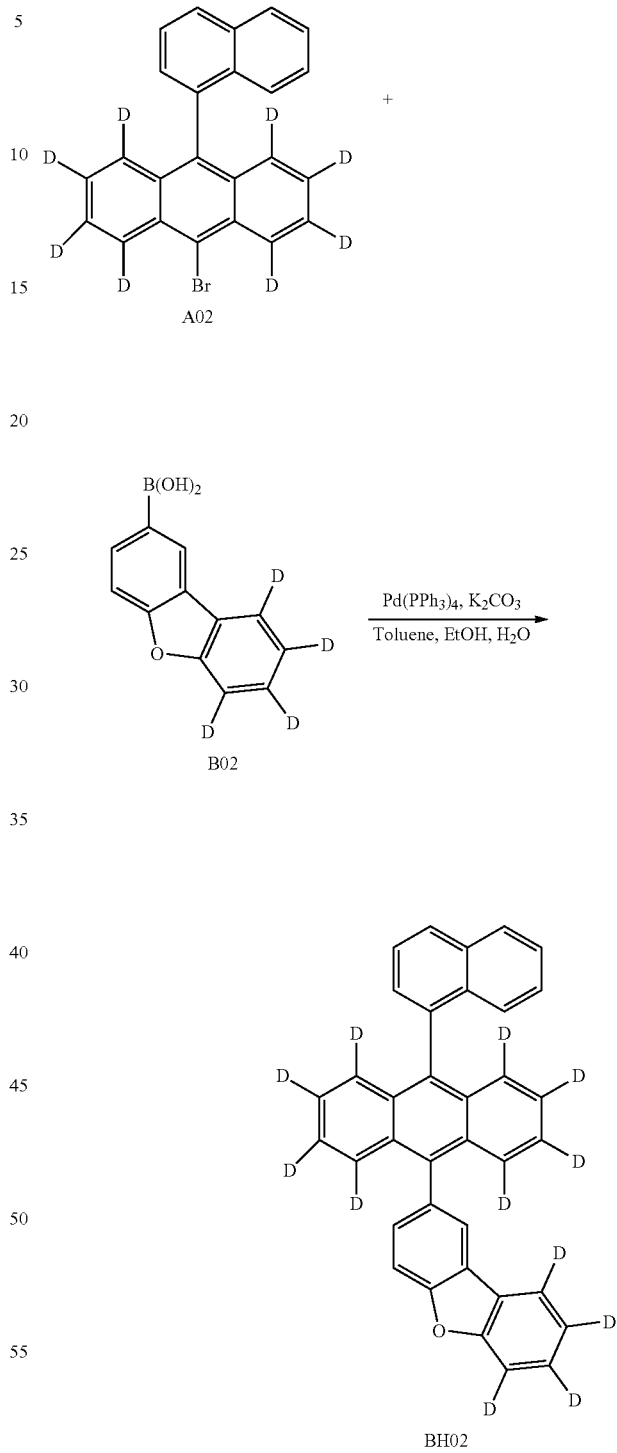

The preparation method was the same as that of Synthesis Example 1, except that A01 and B01 were replaced with A02 (3.91 g, 10 mmol) and B02 (2.16 g, 10 mmol) to finally obtain the product BH02: 3.73 g (yield: 77%), MS: m/z (M+): 484.

Synthesis Example 3

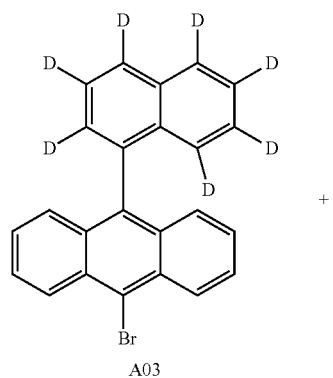

A03

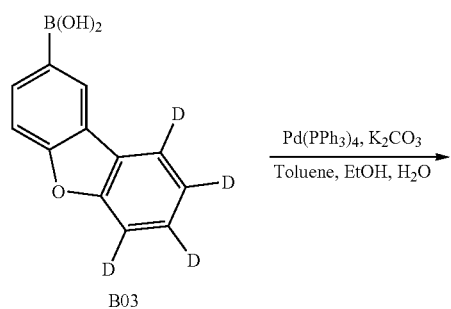

B03

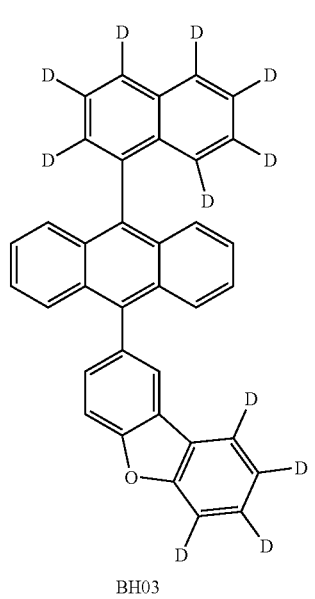

BH03

The preparation method was the same as that of Synthesis Example 1, except that A01 and B01 were replaced with A03 (3.9 g, 10 mmol) and B03 (2.16 g, 10 mmol) to finally obtain the product BH03: 3.77 g (yield: 78%), MS (m/z) (M+): 483.

Synthesis Example 4

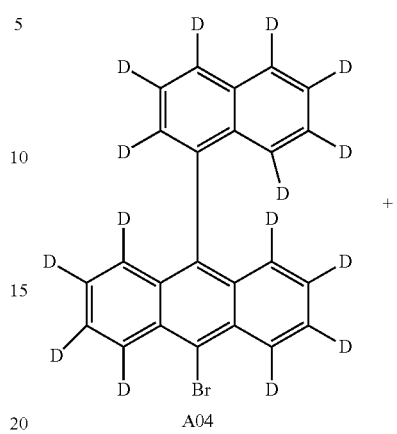

A04

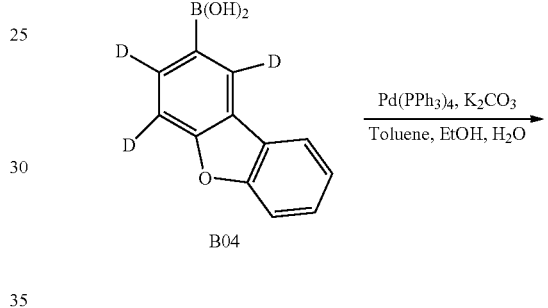

B04

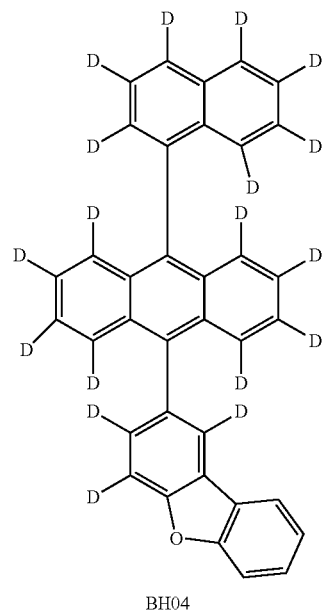

BH04

The preparation method was the same as that of Synthesis Example 1, except that A01 and B01 were replaced with A04 (3.98 g, 10 mmol) and B04 (2.15 g, 10 mmol) to finally obtain product BH04: 4.12 g (yield: 84%), MS (m/z) (M+): 490.

Synthesis Example 5

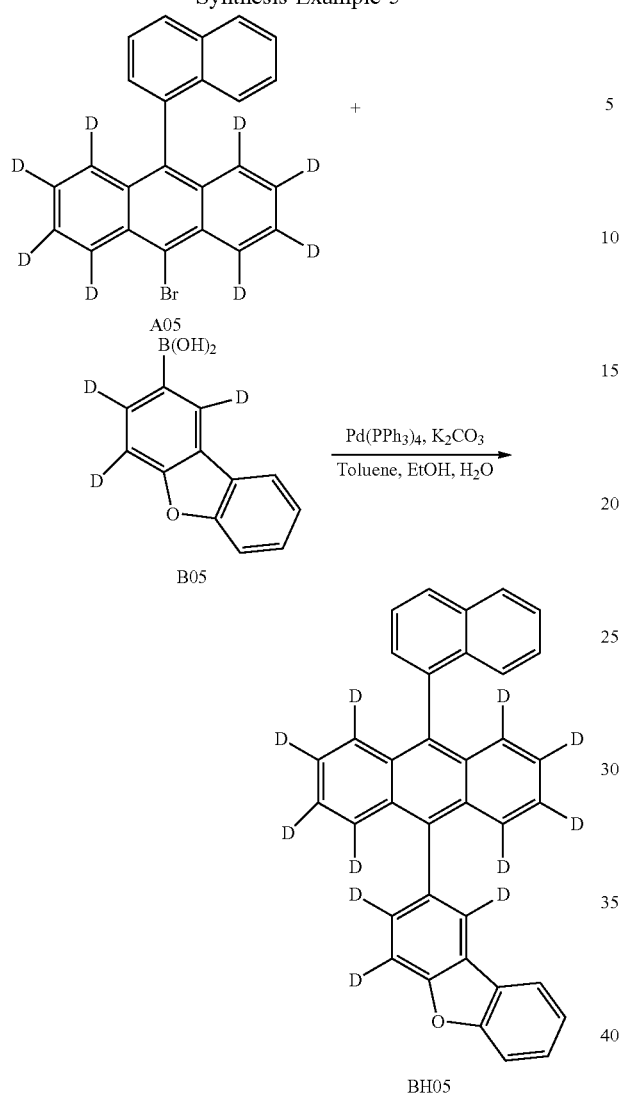

The preparation method was the same as that of Synthesis Example 1, except that A01 and B01 were replaced with A05 (3.91 g, 10 mmol) and B05 (2.15 g, 10 mmol) to finally obtain the product BH05: 3.77 g (yield: 78%), MS (m/z) (M+): 483.

Synthesis Example 6

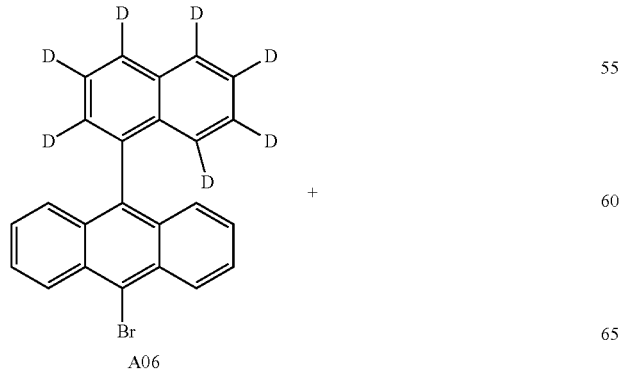

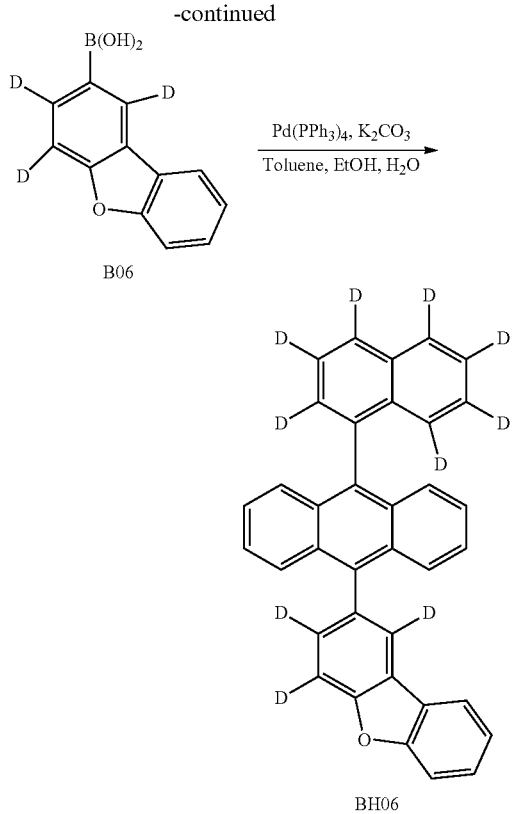

The preparation method was the same as that of Synthesis Example 1, except that A01 and B01 were replaced with A06 (3.9 g, 10 mmol) and B06 (2.15 g, 10 mmol) to finally obtain Compound BH06: 3.9 g (yield: 81%), MS (m/z) (M+): 482.

Compounds of Comparative Examples

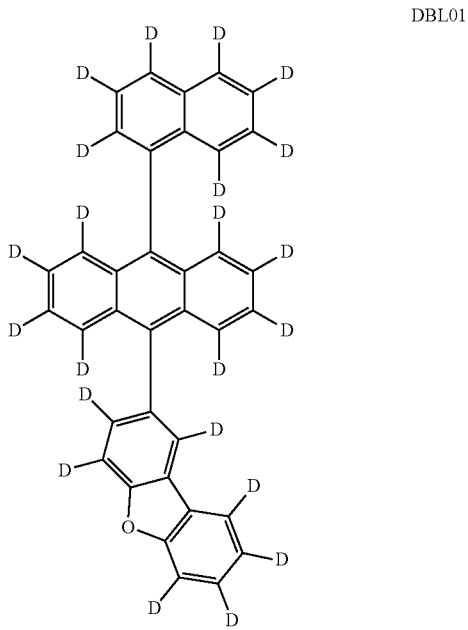

DBL02
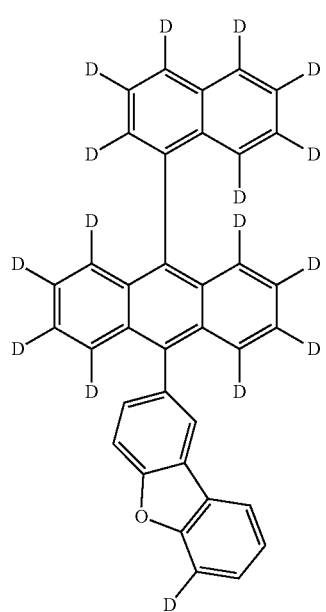
DBL03
DBL04
DBL05
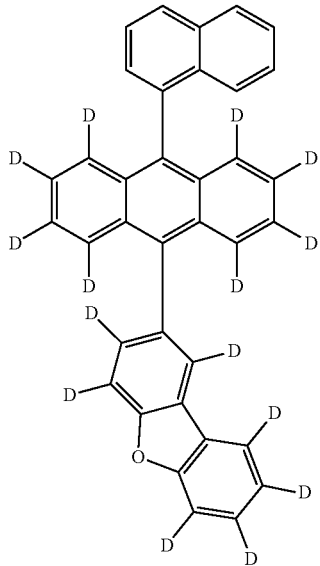
DBL06
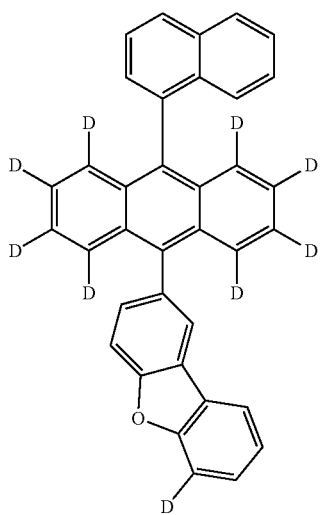
DBL07
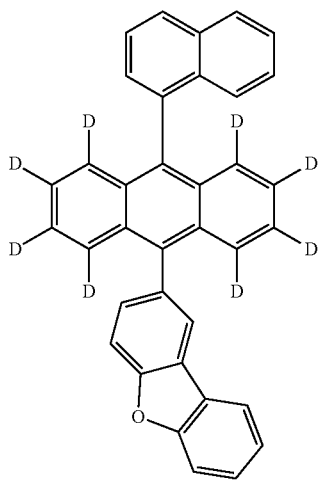

DBL08
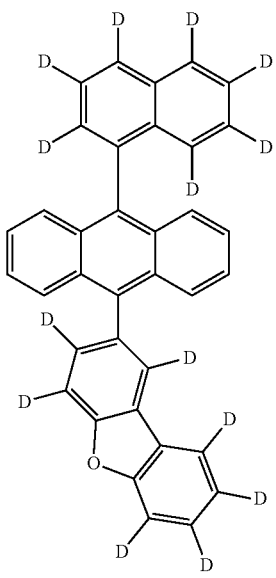
DBL09
DBL10
DBL11
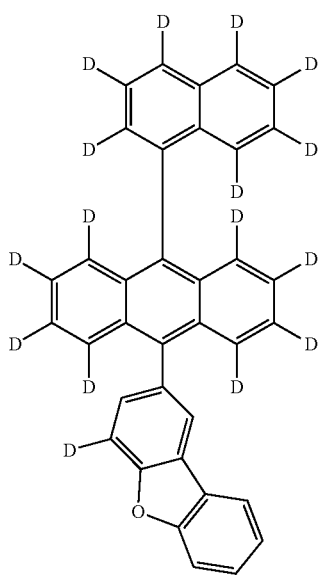
DBL12
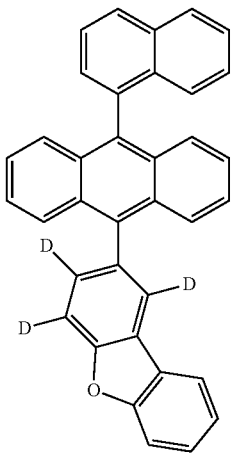
DBL13
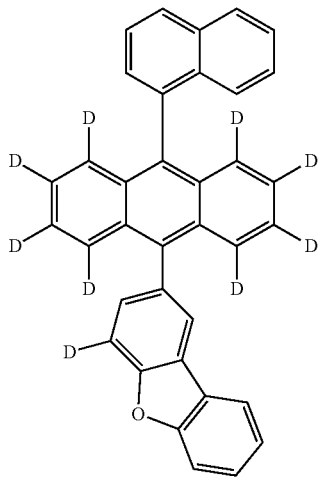

-continued

DBL14

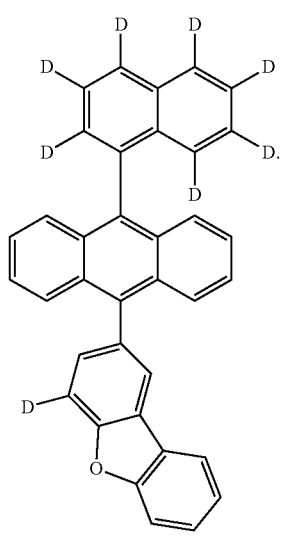

Manufacturing and Characterization of OLEDs

Device Example

The organic electroluminescent device provided by the present invention comprised an anode, a hole transport region, a luminescent layer, an electron transport region, and a cathode, which were arranged in this order on a substrate plate.

Furthermore, the hole transport region comprised a hole injection layer, a hole transport layer, and a luminescent auxiliary layer; and the electron transport region comprised an electron transport layer and an electron injection layer.

Furthermore, the luminescent layer was composed of a host material and a guest material, wherein the host material of the luminescent layer can be composed of one molecular material or a plurality of molecular materials.

The composition of the present invention can be used for the luminescent layer of the above organic electroluminescent device.

The anode in the example was made of an anode material commonly used in the art, such as ITO, Ag or a multilayer structure thereof. The hole injection layer was made of a hole injection material commonly used in the art and was doped with F4TCNQ, HATCN, NDP-9, etc. The hole transport layer was made of a hole transport material commonly used in the art. For the luminescent layer, the host and guest material compositions provided in the present invention were used. The electron transport layer was made of an electron transport material commonly used in the art. For the electron injection layer, electron injection materials commonly used in the art, such as Liq, LiF or Yb were used. For the cathode, materials commonly used in the art were used, such as the metals Al, Ag or metal mixtures (Ag-doped Mg, Ag-doped Ca, etc.).

The electrode preparation method and the deposition method for each functional layer in this example were all conventional methods in the art, such as vacuum thermal evaporation or ink-jet printing. No more detailed repetition would be given here, and only some process details and test methods in the preparation process were supplemented as follows:

Device Example 1

The substrates used in the present invention were all subjected to the following operations: patterning an ITO substrate such that the luminescent area thereof has a size of 3 mm×3 mm, then carrying out an ultrasonic treatment with water/isopropanol, respectively, followed by UV/ozone irradiation and then drying at 100° C., then mounting the ITO substrate on a substrate support in a vacuum deposition device, and adjusting the pressure to make the vacuum rate become $1\times10^{-7}$ torr. Subsequently, the following operations were carried out. Firstly, on an ITO layer (anode) formed on the substrate, HT01 and PD01 (at a mass ratio of HT01 to PD01 of 97:3) were deposited in vacuo to a thickness of 10 nm to form a hole injection layer; secondly, on the above hole injection layer, HT01 was deposited in vacuo to a thickness of 120 nm to form a hole transport layer; thirdly, on the above hole transport layer, BP01 was deposited in vacuo to a thickness of 5 nm to form an electron barrier layer; again, on the above electron barrier layer, a mixture of BH01 and BD01 as provided by the present invention was deposited in vacuo to a thickness of 20 nm to form a luminescent layer, wherein BH01 acted as a host material and BD01 acted as a guest material, with the mass ratio of the host material to the guest material being 98:2; next, on the above luminescent layer, HB01 was deposited in vacuo to a thickness of 5 nm to form a hole barrier layer; then, on the above hole barrier layer, ET01 and LiQ (at a mass ratio of ET01 to LiQ of 1:1) was deposited in vacuo to a thickness of 20 nm to form an electron transport layer; then, on the above electron transport layer, Yb was deposited in vacuo to a thickness of 1 nm to form an electron injection layer; then, on the above electron injection layer, Mg/Ag (at a mass ratio of Mg to Ag of 1:9) was deposited to a thickness of 15 nm to form a cathode; then, on the above cathode, CP01 was deposited to a thickness of 50 nm to form a cover layer; and finally, the evaporated substrate was packaged, wherein the cleaned cover plate was subjected to a coating process with a UV glue by using a gluing apparatus, the coated cover plate was then transferred to a lamination section, the evaporated substrate was placed on top of the cover plate, and finally, the substrate and the cover plate were bonded under the action of a bonding apparatus while the UV glue was cured under light irradiation, thereby preparing a top-emitting organic electroluminescent device.

The molecular structural formulas of the materials in the remaining layers other than the host and guest materials in the luminescent layer were as follows:

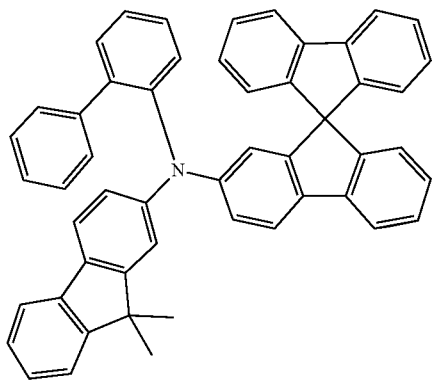

HT01

PD01
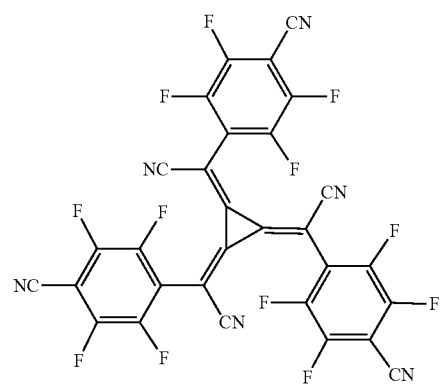
BP01
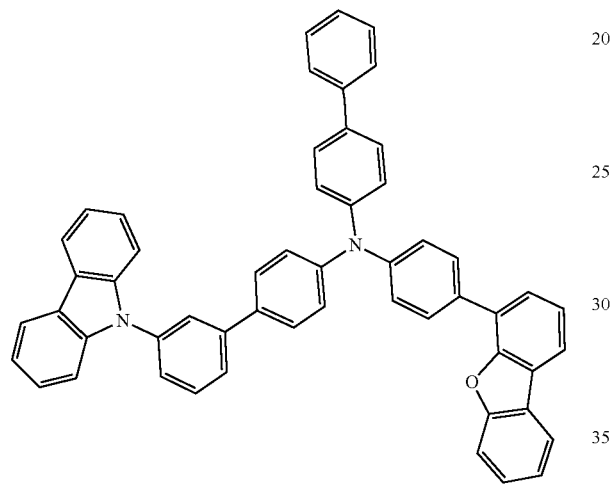
BD01
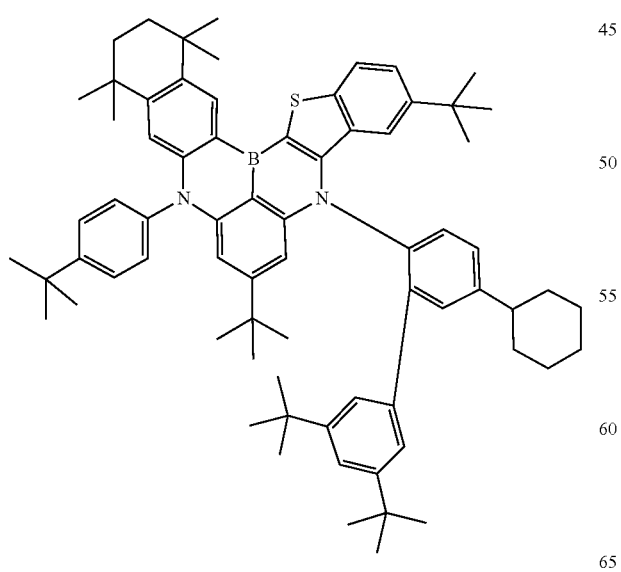
HB01
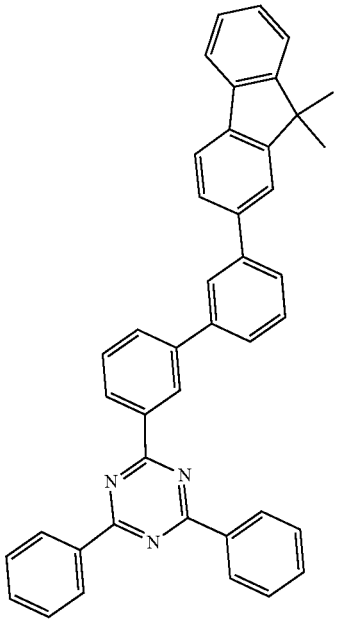
ET01
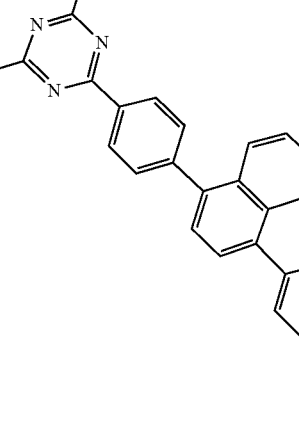
LiQ
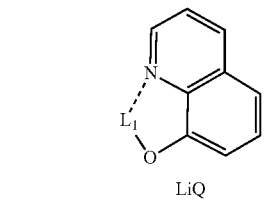

CP01

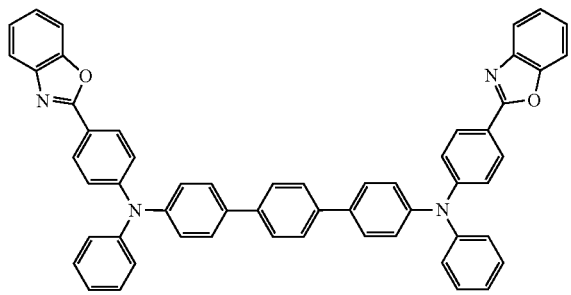

Device Examples 2-6

Using the above method, the compounds described in the other examples in Table 1 were prepared into organic electroluminescent devices, which specifically referred to blue-light organic electroluminescent devices of Examples 2-6, respectively, as prepared by replacing BH01 in Device Example 1 with the host materials shown in the examples in Table 1.

Device Examples 7-9

Using the above method, the compounds described in the other examples in Table 1 were prepared into organic electroluminescent devices, which specifically referred to blue-light organic electroluminescent devices of Examples 7-9, respectively, as prepared by replacing BH01 in Device Example 1 with the host materials shown in the examples in Table 1.

Devices of Comparative Examples 1-14

Using the above method, the compounds described in the comparative examples in Table 1 were prepared into organic electroluminescent devices, which specifically referred to blue-light organic electroluminescent devices of Comparative Examples 1-14, respectively, as prepared by replacing BH01 in Device Example 1 with the host material compositions shown in the comparative examples in Table 1.

The OLED devices described above were tested by means of a standard method.

In this regard, the organic electroluminescent devices were measured at a current density of $J=10$ mA/cm$^2$ for the driving voltage and luminous efficiency. LT95 means that the luminous brightness of the prepared blue-light devices decreases to 95% of the initial value Lo thereof after the time LT95 when working at $J=20$ mA/cm$^2$.

The test instruments and methods for testing the performance of the OLED devices of the above examples and comparative examples were as follows:
- the luminous efficiency C.E (cd/A) and color coordinate (CIEy) were tested by means of spectrum scanner PhotoResearch PR-635;
- the current density and turn-on voltage were tested by digital SourceMeter Keithley 2400;
- the luminous efficiency of the blue-light device was greatly influenced by chromaticity, and in the industry for blue-light devices, the BI value was generally used as the basis of the efficiency of the blue-light devices, wherein BI (Blue index) was obtained by dividing the luminous efficiency C.E (cd/A) by the color coordinate (CIEy); and
- the lifetime test was carried out using a silicon photoelectric OLED device lifetime test system.

The performance test results of the above devices were listed in Table 1.

TABLE 1

Performance test results of blue-light devices

| Device | Host material | Volt(V) | BI(cd/A/CIEy) | LT95(h) |
|---|---|---|---|---|
| Device Example 1 | BH01 | 3.32 | 218.8 | 291 |
| Device Example 2 | BH02 | 3.34 | 218.9 | 270 |
| Device Example 3 | BH03 | 3.35 | 218.5 | 257 |
| Device Example 4 | BH04 | 3.34 | 218.7 | 287 |
| Device Example 5 | BH05 | 3.31 | 218.7 | 266 |
| Device Example6 | BH06 | 3.32 | 218.3 | 256 |
| Device Example 7 | BH01:BH04 = 1:1 | 3.33 | 218.2 | 296 |
| Device Example 8 | BH02:BH05 = 1:1 | 3.32 | 218.4 | 275 |
| Device Example 9 | BH03:BH06 = 1:1 | 3.34 | 218.3 | 260 |
| Device of Comparative Example 1 | DBL01 | 3.32 | 218.1 | 289 |
| Device of Comparative Example 2 | DBL02 | 3.33 | 218.2 | 275 |
| Device of Comparative Example 3 | DBL03 | 3.33 | 218.9 | 265 |
| Device of Comparative Example 4 | DBL04 | 3.32 | 218.9 | 187 |
| Device of Comparative Example 5 | DBL05 | 3.33 | 218.3 | 264 |
| Device of Comparative Example 6 | DBL06 | 3.31 | 218.3 | 241 |
| Device of Comparative Example 7 | DBL07 | 3.35 | 218.2 | 240 |
| Device of Comparative Example 8 | DBL08 | 3.31 | 218.2 | 255 |
| Device of Comparative Example 9 | DBL09 | 3.33 | 218.3 | 220 |
| Device of Comparative Example 10 | DBL10 | 3.34 | 218.1 | 216 |
| Device of Comparative Example 11 | DBL11 | 3.33 | 218.5 | 268 |
| Device of Comparative Example 12 | DBL12 | 3.33 | 218.4 | 181 |
| Device of Comparative Example 13 | DBL13 | 3.36 | 218.2 | 243 |
| Device of Comparative Example 14 | DBL14 | 3.34 | 218.3 | 217 |

As can be seen from the above table, after deuteration is introduced into key sites on dibenzofuran, the present invention can achieve a lifetime improvement effect comparable to that of the perdeuterated compound. For example, the lifetime of the device comprising BH01 and BH04 was substantially comparable to that of the device comprising the perdeuterated DBL01, the lifetime of the device comprising BH02 and BH05 was substantially comparable to that of the device of DBL05 comprising perdeuterated anthracene and dibenzofuran, and the lifetime of the device comprising BH03 and BH06 was substantially comparable to that of DBL08 comprising perdeuterated naphthalene and dibenzofuran, indicating that the compound of the present invention can improve the stability of the material after deuterium is introduced at specific sites. Notably, semi-deuterated dibenzofuran can achieve the same lifetime effect as that of the device in which the same moiety was perdeuterated.

In particular, it can be seen that the lifetime of Device Example 1 of the present invention is significantly improved as compared with that of the device of Comparative Example 2 and the device of Comparative Example 3, indicating that when the degree of deuteration in the fused ring part was the same but non-deuterated dibenzofuran or less-deuterated dibenzofuran was used, it was impossible to obtain the same lifetime improvement effect as that of the perdeuterated case; and compared with DBL04, which had only semi-deuterated dibenzofuran while the fused ring part was not deuterated, the lifetime of the device was significantly improved, indicating that the improvement of the device lifetime was limited if only semi-deuterated dibenzofuran was used. Although the semi-deuterated dibenzofuran improved the stability of the host material itself to some extent, the lack of deuteration of the fused ring part might make the energy of the host material in the excited state higher, resulting in the deterioration effect on the adjacent layer materials being obvious, thereby showing a relatively poor lifetime performance.

By comparing BH02 with DBL06, DBL07 and DBL04, comparing BH03 with DBL09, DBL10 and DBL04, comparing BH04 with DBL11, DBL03 and DBL12, comparing BH05 with DBL13, DBL03 and DBL12, and comparing BH06 with DBL14, DBL03 and DBL12, it can be similarly concluded that when the degrees of deuteration in the naphthyl group and in the anthracene nucleus skeleton were the same, the present invention showed an improved lifetime as compared with the comparative examples in which the dibenzofuran part was not deuterated or a specific site was not perdeuterated, and compared with the materials DBL04 and DBL12 in which only the dibenzofuran was semi-deuterated, the deuteration of the anthracene nucleus or naphthyl group in the present invention also greatly improved the lifetime of the device, indicating that the compound of the present invention can achieve a lifetime improvement effect comparable to that of the perdeuterated compound only by using fewer deuterium atoms.

Compared with DBL01, the lifetime of Example 7 in which two hosts were used was substantially comparable to that of the perdeuterated material and also showed improvement as compared with the case where only one host was used. This is because stable co-evaporation using two hosts was beneficial to the film-forming process in the evaporation process, leading to reduced defects in the organic film layers and the gap between organic film layers, thus reducing the deterioration sites in the material and improving the lifetime performance of device.

Obviously, the above examples of the present invention are only examples for clearly explaining the present invention and are not intended to limit the embodiments of the present invention. For those of ordinary skill in the art, other changes or variations in different forms may also be made on the basis of the above description. It is impossible to exhaust all the embodiments herein, and all derived obvious changes or variations that belong to the technical solution of the present invention still fall within the scope of protection of the present invention.

The invention claimed is:

1. A blue luminescent compound, characterized in that the blue luminescent compound is selected from one of the following structures:

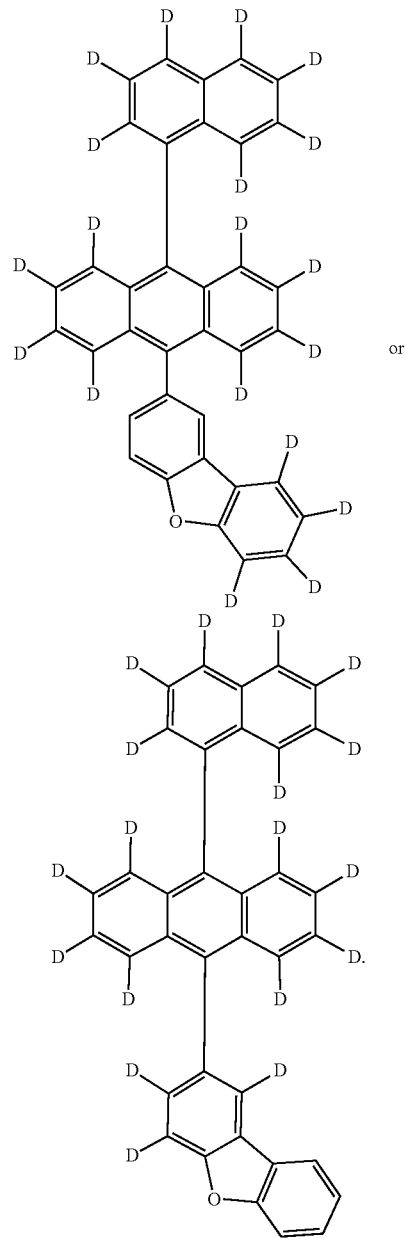

2. A blue luminescent composition, characterized in that the composition comprises two or more blue luminescent compounds according to claim 1.

3. An electroluminescent device comprising Use of the blue luminescent compound according to claim 1.

4. An organic electroluminescent device, characterized by comprising an anode, a hole transport region, a luminescent layer, an electron transport region, and a cathode, which are sequentially arranged on a substrate plate, wherein the luminescent layer comprises the blue luminescent compound according to claim 1.

5. An organic electroluminescent device, characterized by comprising an anode, a hole transport region, a luminescent layer, an electron transport region, and a cathode, which are sequentially arranged on a substrate plate, wherein the luminescent layer comprises a blue luminescent compound, characterized in that the blue luminescent compound is selected from one of the following structures:

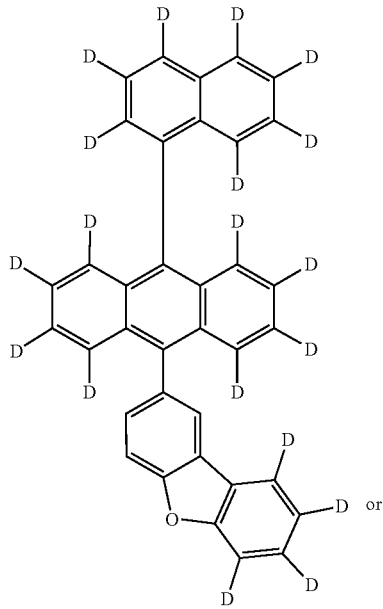 [SMILES: [2H]c1c([2H])c([2H])c2c(oc3ccc(-c4c5c([2H])c([2H])c([2H])c([2H])c5c(-c5c([2H])c([2H])c([2H])c6c([2H])c([2H])c([2H])c([2H])c56)c5c([2H])c([2H])c([2H])c([2H])c45)cc32)c1[2H]] or

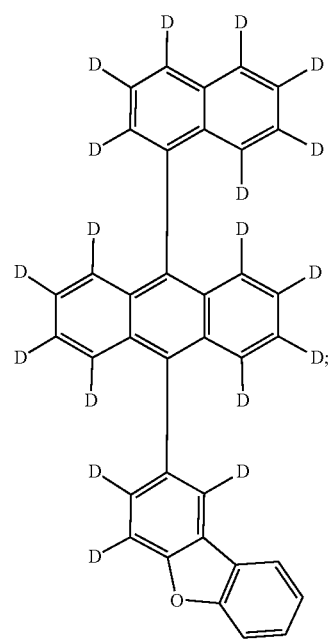

6. A display device, characterized by comprising the organic electroluminescent device according to claim 4.

7. A lighting device, characterized by comprising the organic electroluminescent device according to claim 4.

8. An electroluminescent device comprising Use of the blue luminescent composition according to claim 2.

9. An organic electroluminescent device, characterized by comprising an anode, a hole transport region, a luminescent layer, an electron transport region, and a cathode, which are sequentially arranged on a substrate plate, wherein the luminescent layer comprises the blue luminescent composition according to claim 2.

10. A display device, characterized by comprising the organic electroluminescent device according to claim 5.

11. A lighting device, characterized by comprising the organic electroluminescent device according to claim 5.

12. An organic electroluminescent device, characterized by comprising an anode, a hole transport region, a luminescent layer, an electron transport region, and a cathode, which are sequentially arranged on a substrate plate, wherein the luminescent layer comprises a blue luminescent composition, characterized in that the composition comprises two or more blue luminescent compounds, each blue luminescent compound characterized in that the blue luminescent compound is selected from one of the following structures:

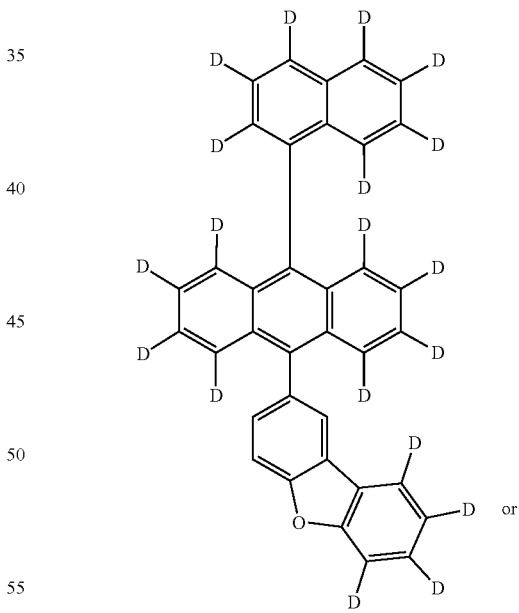 or wherein in the above structures, any oxygen can be replaced by $^{17}O$ or $^{18}O$, and any carbon can be replaced by $^{13}C$, and the organic electroluminescent device is further characterized in that the luminescent layer comprises a host material and a guest material, wherein the host material comprises at least the blue luminescent compound.

wherein the organic electroluminescent device is further characterized in that the luminescent layer comprises a host material and a guest material, wherein the host material comprises at least the blue luminescent composition.

13. A display device, characterized by comprising the organic electroluminescent device according to claim 12.

14. A lighting device, characterized by comprising the organic electroluminescent device according to claim 12.

* * * * *